(No Model.) 2 Sheets—Sheet 1.
W. M. STINE.
BATTERY.

No. 512,567. Patented Jan. 9, 1894.

WITNESSES:
F. McArdle.
C. Sedgwick.

INVENTOR
W. M. Stine
BY Munn & Co.
ATTORNEYS (No Model.) 2 Sheets—Sheet 2.
W. M. STINE.
BATTERY.
No. 512,567. Patented Jan. 9, 1894.
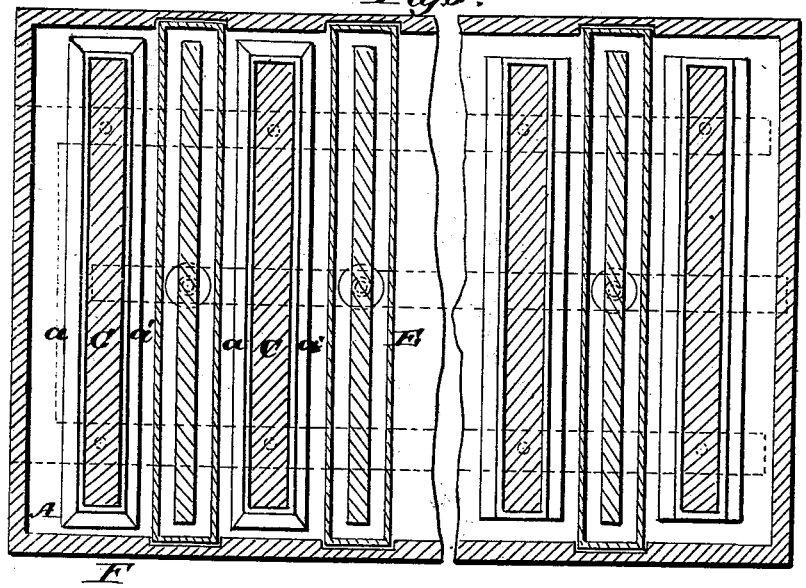
WITNESSES:
F. McArdle
E. Sedgwick
INVENTOR:
W. M. Stine
BY Munn & Co.
ATTORNEYS

UNITED STATES PATENT OFFICE.

WILBUR M. STINE, OF ATHENS, OHIO.

BATTERY.

SPECIFICATION forming part of Letters Patent No. 512,567, dated January 9, 1894.

Application filed July 21, 1891. Serial No. 400,211. (No model.)

*To all whom it may concern:*

Be it known that I, WILBUR M. STINE, of Athens, in the county of Athens and State of Ohio, have invented a new and Improved Battery, of which the following is a specification, reference being had to the annexed drawings, forming a part thereof, in which—

Figure 1:
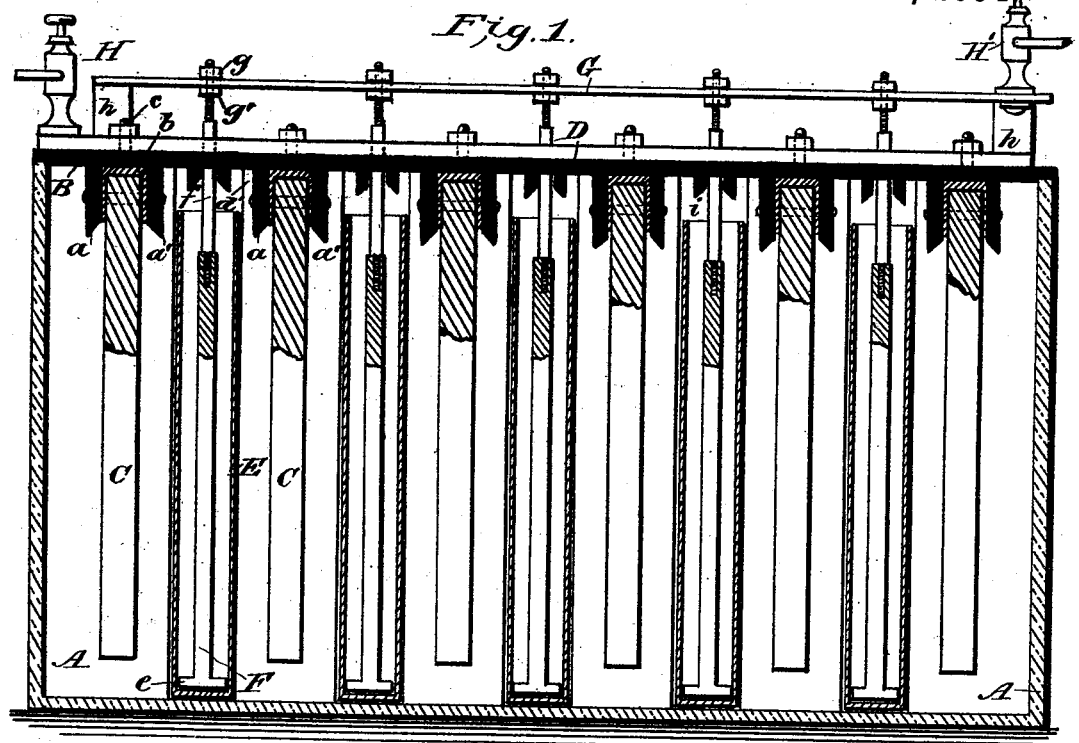
Figure 2:
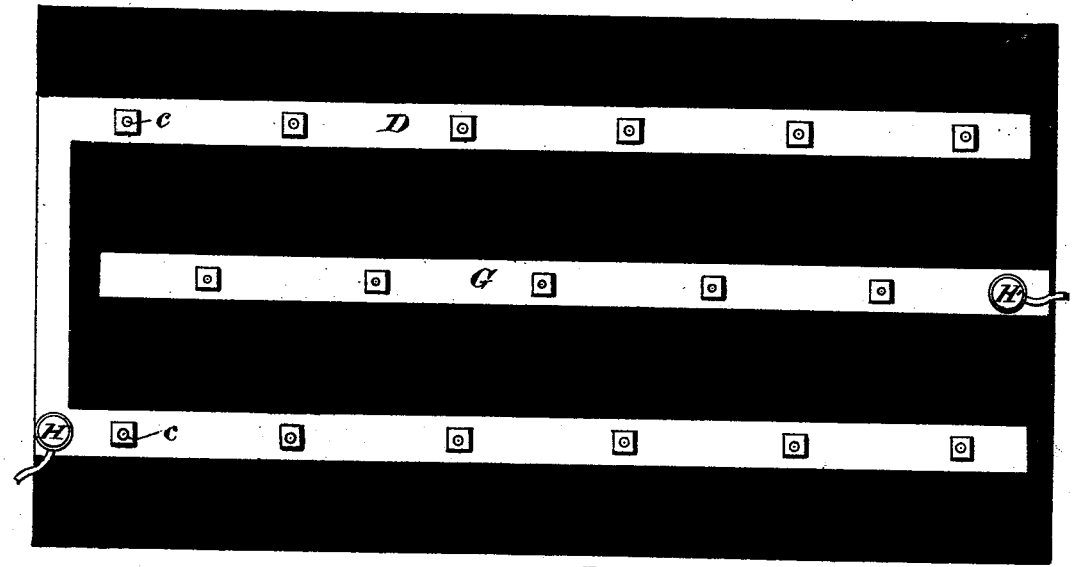

Figure 1 is a longitudinal section of my improved battery. Fig. 2 is a plan view of the same. Fig. 3 is a horizontal section of the battery, looking upward showing two forms of modification.

Similar letters of reference indicate corresponding parts in the views.

The object of my invention is to construct a battery which may be used as a primary battery, and which when run down may be economically recharged after the manner of a storage battery and then again employed as a primary battery, the electrolyte and the electrodes being of such a nature as to render the products of chemical action soluble instead of being deposited on plates, with the exception of the zinc, the battery being so constructed that the charging operation will renew both the active electrolyte and the depolarizing mediums.

The battery consists of one or more positive plates of zinc placed in porous cups, one or more negative plates of carbon or reduced copper oxide, and an electrolyte composed of potassium zincate with an excess of potassium hydrate and also potassium bromide.

The containing cell A, which may be of glass, vulcanite, or other suitable material, is furnished with a lid B, of insulating material such as vulcanite, or porcelain, provided with downwardly-extending projections $a$, $a'$, arranged in pairs, the said projections being beveled from their adjoining faces downwardly and outwardly, forming sharp edges which prevent the creeping of salts or liquid, and in consequence thereof, the short circuiting of the battery. These projections may extend entirely around the carbon, forming an inclosing collar. Between each pair of projections $a$, $a'$, is placed the upper end of a negative plate C, of carbon, said plate being provided with a metallic cap $b$, from which two studs $c$ project upwardly through the lid, and through a U-shaped conductor D, mounted on the upper surface of the lid B.

In the side walls of the cell A are formed grooves $d$, for receiving the flat porous cells E. The said grooves $d$ are located midway between the carbon plates C, so that the porous cells are supported centrally in the space between the carbon plates. In each porous cell is placed a zinc plate F, which extends to the bottom of the cell, and is provided with a flanged lower end $e$, which covers the bottom of the porous cell and holds the plate in a central position, while serving at the same time to receive the detached particles of zinc which may fall to the bottom of the cell. In the upper end of the zinc plate F is inserted a rod $f$, which extends through the lid B, and is threaded at its upper end to receive the nuts $g$, $g'$.

To the lid B, is attached a metallic bar G, by means of standards $h$ which support the said bar a short distance above the lid. The rods $f$ extend through holes in the bar G, and the nuts $g$, $g'$, arranged above and below serve to adjust the zinc plate and also to form the electrical connection between the rod $f$ and the bar G. This construction permits of forcing the flanged lower end of the zinc plate downward against the bottom of the porous cell E, thereby retaining the porous cell in its place.

The U-shaped bar D is provided with a binding post H for receiving the conductor, and in a similar way the bar G is provided with a binding post H'. The lid B is provided with a downwardly-projecting countersunk boss $i$, which surrounds each rod $f$, and prevents the salts or liquid from creeping so as to short circuit the battery.

The solution used in my improved battery is an alkaline exciting liquid consisting of a mixture of sodium hydrate, sodium zincate, sodium chloride and sodium chlorate, the whole in aqueous solution. The soluble depolarizing medium, which in this case is sodium chlorate, yields oxygen which combines with the hydrogen on discharging the batteries, and is eventually reduced to sodium chloride. When the battery is charged it will again absorb oxygen from the positive pole and be converted into hypo-chlorite, chlorite, and finally into chlorate of sodium. There is consequently no deposition on the positive pole.

In some cases I use an alkaline exciting liquid formed of potassium zincate, potassium bromide, potassium hydrate and potassium bromate, the potassium bromate being used as the soluble depolarizing medium.

It is obvious that in the construction of the battery, porous envelopes of parchment paper or asbestus fabric may be used in lieu of porous cells of unglazed porcelain. Therefore I do not confine myself to the exact construction described.

My improved battery may be at first constructed as a primary battery, using an electrolyte of potassium hydrate and bromate, or of sodium hydrate and sodium chloride and chlorate. When run down this could be reversed.

In the above description of my improved battery I regard sodium or potassium hydrate, zincate, chloride or bromide as equivalents, as they are interchangeable; they may also be used together.

Having thus described my invention, I claim as new and desire to secure by Letters Patent—

In a storage battery, an alkaline electrolyte formed of a mixture of sodium hydrate, sodium zincate, sodium chloride, and sodium chlorate, the whole in aqueous solution, as specified.

WILBUR M. STINE.

Witnesses:
AGNES Q. BOBB,
J. B. SPANGLER.